US011885148B2

(12) United States Patent
Chivulescu

(10) Patent No.: US 11,885,148 B2
(45) Date of Patent: Jan. 30, 2024

(54) POOL AERATOR

(71) Applicant: Octavian Paul Chivulescu, Voluntari (RO)

(72) Inventor: Octavian Paul Chivulescu, Voluntari (RO)

( * ) Notice: Subject to any disclaimer, the term of this patent is extended or adjusted under 35 U.S.C. 154(b) by 130 days.

(21) Appl. No.: 17/423,841

(22) PCT Filed: Jun. 16, 2020

(86) PCT No.: PCT/RO2020/000009
§ 371 (c)(1),
(2) Date: Jul. 16, 2021

(87) PCT Pub. No.: WO2021/015634
PCT Pub. Date: Jan. 28, 2021

(65) Prior Publication Data

US 2022/0081922 A1 Mar. 17, 2022

(30) Foreign Application Priority Data

Jul. 25, 2019 (RO) .............................. a 2019 00453
Nov. 1, 2019 (RO) .............................. u 2019 00036

(51) Int. Cl.
*E04H 4/16* (2006.01)
*B05B 15/74* (2018.01)
(Continued)

(52) U.S. Cl.
CPC ......... *E04H 4/169* (2013.01); *B01F 23/2326* (2022.01); *B05B 15/74* (2018.02); *E04H 4/1245* (2013.01)

(58) Field of Classification Search
CPC ........... E04H 4/169; E04H 4/14; A61H 33/02; A61H 33/027; A61H 33/026;
(Continued)

(56) References Cited

U.S. PATENT DOCUMENTS 3,067,435 A * 12/1962 Nash .................. A61H 33/6063 4/492
3,577,571 A 5/1971 Bellinson
(Continued)

FOREIGN PATENT DOCUMENTS

CA 2027297 A1 4/1992
CH 561059 A5 4/1975
(Continued)

*Primary Examiner* — Erin Deery
(74) *Attorney, Agent, or Firm* — Preston Smirman; SMIRMAN IP LAW, PLLC

(57) ABSTRACT

A pool aerator for pools with water recirculation circuit includes a hemispherical body and an atmospheric air intake pipe. The body of the aerator includes a rounded plastic object, having in the middle area a cylindrical portion, and at one end with a connecting means to the pool nozzle. The middle portion of the aerator body continues with a hemispherical dome. A Venturi tube made in the form of two intersected frustoconical spaces is positioned in the hemispherical dome. One of the intersected frustoconical spaces functions as an inlet and the other for mixing and discharging water mixed with air. The two axes of the intersected frustoconical spaces form an angle (α) between 10 and 20 degrees. The mixing hole communicates with a vertical cylindrical hole, in which the intake pipe is inserted by sliding, until the inner wall of the frustoconical hole is reached.

15 Claims, 7 Drawing Sheets

(51) Int. Cl.
*E04H 4/12* (2006.01)
*B01F 23/2326* (2022.01)

(58) Field of Classification Search
CPC ............ A61H 33/028; A61H 2033/021; A61H 2033/022; A61H 2033/143; B05B 15/74; B01F 25/53; B01F 25/31242; B01F 25/312; B01F 23/232
See application file for complete search history.

(56) References Cited

U.S. PATENT DOCUMENTS

| | | | | | |
|---|---|---|---|---|---|
| 3,745,994 | A * | 7/1973 | Kane | A61H 33/027 601/169 |
| 3,810,464 | A * | 5/1974 | Sheeler | B01F 23/23121 601/167 |
| 3,904,393 | A * | 9/1975 | Morse | B01F 25/21 55/505 |
| 4,308,138 | A | 12/1981 | Woltman | |
| 5,172,432 | A | 12/1992 | Beland | |
| 5,279,003 | A * | 1/1994 | Gape | A61H 33/6063 239/425.5 |
| 6,138,293 | A | 10/2000 | Mathews | |
| 6,237,897 | B1 | 5/2001 | Marina | |
| 6,367,097 | B1 | 4/2002 | Arnau | |
| 6,398,194 | B1 | 6/2002 | Tsai et al. | |
| 10,202,781 | B1 | 2/2019 | Orosco | |

FOREIGN PATENT DOCUMENTS

| | | | |
|---|---|---|---|
| FR | 2760356 | A1 | 9/1998 |
| WO | 2016/181209 | A1 | 11/2016 |

* cited by examiner

POOL AERATOR

FIELD OF THE INVENTION

The present invention relates to a improved pool water aerator, being intended for use in swimming pools equipped with a water recirculation and filtration circuit, used in order to oxygenate the water.

BACKGROUND OF THE INVENTION

Maintaining the pool water at the quality parameters recommended by the rules in force is an essential factor for a public or private pool, and is achieved by recirculating, filtering, aerating and adding specialized chemical agents.

Water recirculation is an essential process that helps keep a pool clean and within quality parameters. Recirculation is performed in a circuit with the help of a pump, the circuit being provided with water filtration means (a sand filter or filtering paper) and after the water is filtered of the impurities, it is sent back to the pool.

In parallel with water filtration, several chemical agents dissolved in the pool water are used, such as: slow chlorine, shock chlorine, flocculant, anti-algae, pH minus, pH plus and others, all with different specialized functions in terms of water cleaning and maintaining it in optimal parameter conditions.

The advantages of water aeration are multiple, known and verified for many years, being use in obtaining of a very clear water, like spring running water compared to the stagnant water of a lake, with a fresh and airy smell. Aerations improve pool water circulation, substantial reduction of chlorine odor, obtaining an uniform distribution of chlorine in the water mass, which leads to an increase in its efficiency while reducing the amount needed to be used and, at the same time, prevents the production of algae in water or on the walls and bottom of the pool; Aeration also helps to get a faster cleaning of the water surface of floating impurities that reach the surface collector (skimmer). At the same time, by aerating the water with small diameter air bubbles, a high transfer of oxygen dissolved in the water is obtained, which improves the appearance and quality of the water by: maintaining some species of aerobic bacteria that consume organic matter in water; destruction of anaerobic bacteria that produce $CO_2$ and hydrogen sulfide (responsible for the unpleasant smell of stagnant water); oxidation of Mg and Fe particles responsible for water opacification; bonding the microparticles (like limestone) into larger particles, which can then be easily retained by the filter; increasing the pH of the water without changing the alkalinity (due to the elimination of $CO_2$ from the water at an accelerated rate). In addition, aeration helps to heat or cool the water depending on the temperature of the aspirated air (the air is hot during the day and cold at night) by lowering its temperature in the water mass. In the end, the aeration ensures an extremely appreciated visual effect which is the air bubbles passing through the pool water.

SUMMARY OF THE INVENTION

The present invention relates to an improved swimming pool aerating device, that is working even at low water jet pressures, and it can be easily installed by simply screwing in the discharge nozzles of any type of existing swimming pool made out of concrete, metal or plastic, either above or underground, in order to mix the water coming from the filtration system, with the air captured from the water surface, mixture coming out in the swimming pool water in the form of a jet of high efficiency small air bubbles, which contributes to obtaining a high degree of oxygen dissolved in water, in the purpose of its aeration. Aerating the water of a swimming pool brings many benefits, its effects can be easily found in nature, just comparing the crystalline water of a running water, to the cloudy, dark and full of algae water of a stagnant water. The aerator comprising a plastic hemispherical or frustoconical spray body made in the form of a Venturi tube and an atmospheric air intake pipe. The air is attracted inside the aerator by the negative pressure generated by the moving water of the existing pool filtration circuit (the Venturi effect).

The technical problem solved by the invention is the aeration of water from a swimming pool provided with a recirculation-filtration circuit, using a simple and efficient device, which can be mounted very easily to already built swimming pools.

The aerator for swimming pools provided with a water recirculation circuit, according to the invention, is defined by its characteristics which are highlighted in claims 1-8.

STATE OF THE ART

From physics—fluid dynamics, we know about the Venturi effect (application of Bernoulli's principle), according to which an increase in the velocity of a laminar flow fluid flowing going through a tube, when passing through a narrow portion of a tube, occurs simultaneously with a decrease in pressure.

Since 1797, when Giovanni Venturi discovered the effect that bears his name, many applications have been built based on his principle, some of them that are successfully applied in the most diverse fields of technology, of which, perhaps the best known is the airbrush or sprayer, but also in the aeration of ponds and pools waters, which shows there is a continuing need for improvement.

Typical devices used for water aeration are shown, for example, in the following United States of America patents:

| | |
|---|---|
| U.S. Pat. No. 10 202 781 B1 | Orosco |
| U.S. Pat. No. 4,308,138 | Woltman |
| U.S. Pat. No. 6,398,194 B1 | Tsai et al |
| U.S. Pat. No. 6,237,897 B1 | Marina |
| U.S. Pat. No. 6,367,097 B1 | Arnau |
| U.S. Pat. No. 5,172,432 A | Beland |
| U.S. Pat. No. 3,745,994 A | Kane |
| U.S. Pat. No. 3,577,571 A | Belinson |
| U.S. Pat. No. 6,138,293 A | Mathews |

In relation to the state of the art, the pool aerator according to the invention has the following advantages:

- high efficiency of aeration of pool water, including at low water jet pressures, due to the ideal positioning and angle of the air pipe mounted in the frustoconical cone hollow body of the Venturi tube, located inside the aerator body
- extremely easy installation, by simply screwing in the existing nozzle of the pool, and does not require operations inside or behind the wall of the pool,
- gives the possibility to be used in an already built swimming pool, at any time, and it is not necessary to drain the water for installation, nor even to stop the pump from functioning,
- possibility to be used in underground or above ground pools, made of concrete, plastic or metal, simple, elegant design and safe to operate at a low cost.

BRIEF DESCRIPTION OF THE DRAWINGS

Some embodiments of the invention is given below in connection to FIG. 1-4 which represents.

DETAILED DESCRIPTION OF THE INVENTION

The invention consists of two plastic parts, which work on the Venturi principle, the first part being mounted in the existing discharge nozzle in the pool, and the second, which brings the air from the atmosphere from the water surface, into the aerator.

Figure 1:
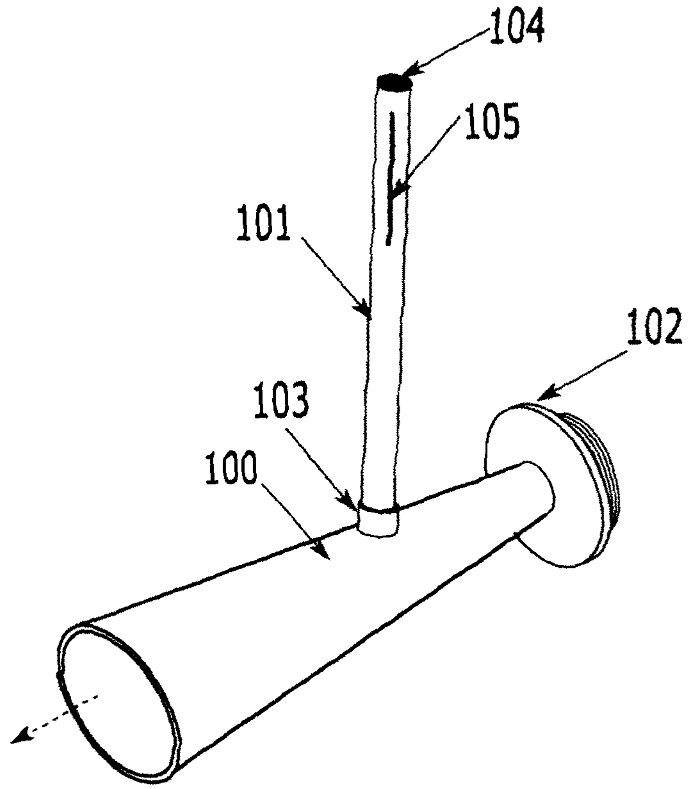
FIG. 1 is an overview of a first embodiment of the pool aerator according to the invention.
Figure 1A:
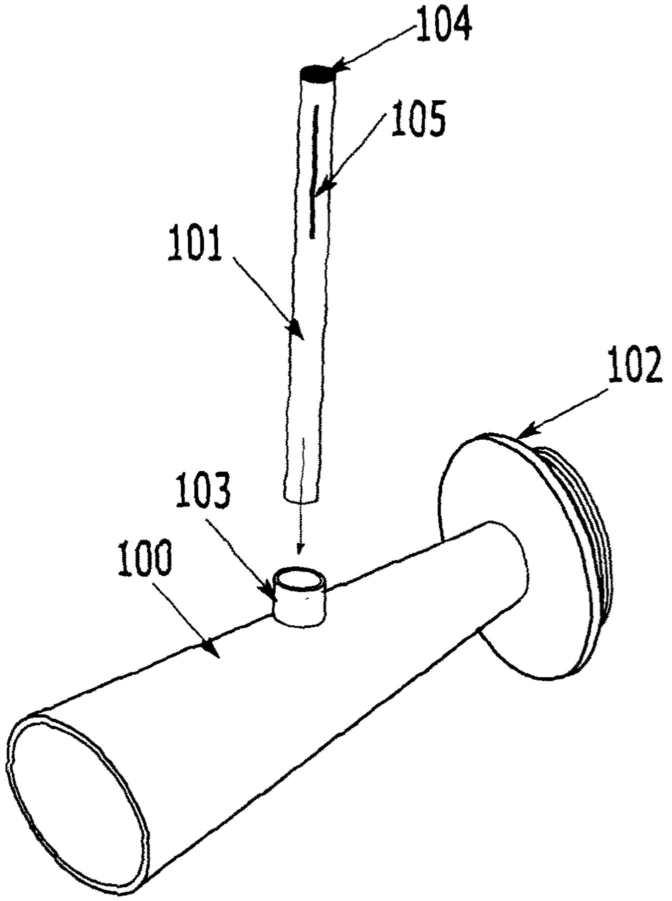
FIG. 1A, is a detailed view of the pool aerator from FIG. 1.

With reference to FIG. 1 and FIG. 1A, the pool aerator with water recirculation circuit includes a spray body 100 and a intake pipe 101 of the atmospheric air. The spray body 100 consists of a frustoconical plastic tube, being provided at the smaller diameter end with a connecting means 102 to a recirculated water outlet/nozzle, in the pool, below the level of the pool water; the other end, larger in diameter, is free for the evacuation of the aspirated air mixed with recirculated water, in the pool water.

Figure 1B:
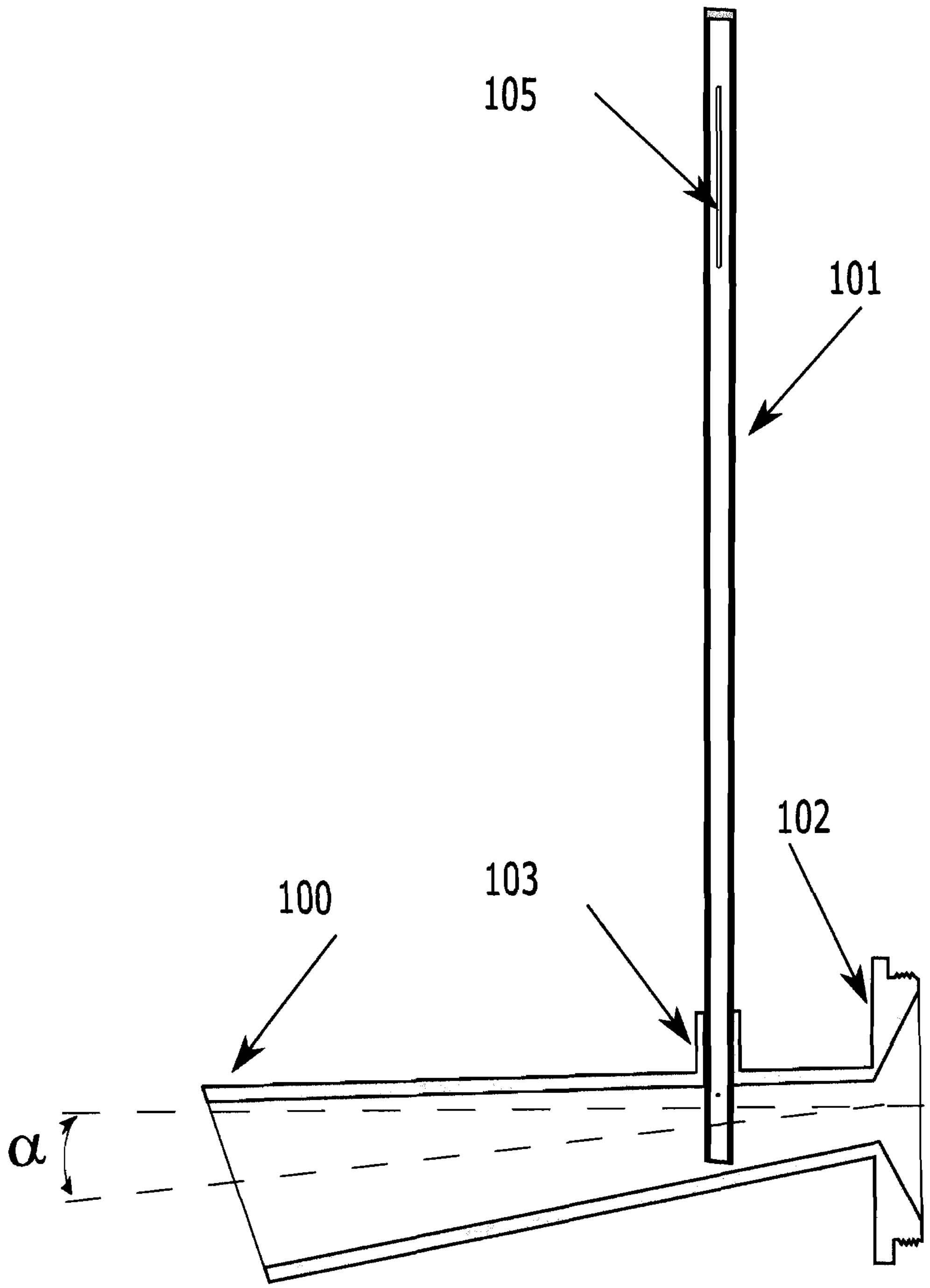
FIG. 1B, is a longitudinal cross-section view of the pool aerator from FIG. 1.

With reference to FIG. 1B, cross-section through the aerator of FIG. 1, the longitudinal axis of the frustoconical plastic tube of the spray body 100 is inclined at an angle ($\alpha$) between 10-20 degrees from the horizontal (perpendicular to the basic plane of the connecting means 102, so that the intake pipe once inserted in the body of the aerator stands in a vertical position, parallel to the pool wall. In the length of the spray body 100, it is provided with a branch having also the role of cylindrical guide 103, in which it is inserted by sliding, until reaching the inner wall of the tube, the lower end of intake pipe 101. The axis of the cylindrical guide 103 is vertical, so that between this and the longitudinal axis of the spray body there is an angle (a) between 10-20 degrees, an optimal angle and position to produce the maximum efficiency of the density of air bubbles dispersed in water.

With reference to FIG. 1, FIG. 1A and FIG. 1B, the air intake pipe 101 consists of a plastic pipe having an outer diameter that allows it to slide through the cylindrical guide 103, and a length that makes its upper third stand above the water. This pipe is closed at the upper end by a plug 104, being provided, also at this end, in a first embodiment, with a longitudinal slot 105 for air absorption, which ensures a low noise level during operation.

In a first concrete embodiment, the spray body 100 has the approximate dimensions: the outer diameter of 18 mm at the narrow end, the outer diameter of 43 mm at the opposite end, and a total length of about 195 mm. As shown in FIG. 1, FIG. 1*a* and FIG. 1*b*, the aerator has, at the narrow end, cast, a cylindrical flange threaded on the outside, acting as a connecting means 102, having a hollow interior, also of frustoconical shape which is connected on the same diameter to a plastic tube of frustoconical shape of the spray body 100. With the help of this flange the body of the spray 100 is screwed into the body of an existing nozzle in the pool wall (after removing the nozzle ball), thus ensuring the installation of the aerator in the pool. Also, in the first third of the length of the aerator from the connecting means 102, there is a cylindrical guide 103, cast, with an inner diameter of about 11 mm, a height of about 15 mm, vertically oriented, a guide in which the pipe is inserted by sliding air intake 101.

The air intake pipe 101 consists of a cylindrical plastic pipe with an outer diameter of about 11 mm and a length of about 350 mm, which makes one end of it stand out of the water, the recommended dimensions for mounting the discharge nozzles being 300 mm below the water level. This pipe is closed at one end by a plug 104 and also provided, also at this end, with an air slot 105 of approximate dimensions: 0.5 mm width and 30 mm length. This slot ensures a low level of noise during the operation of the aerator according to the invention.

Figure 4:
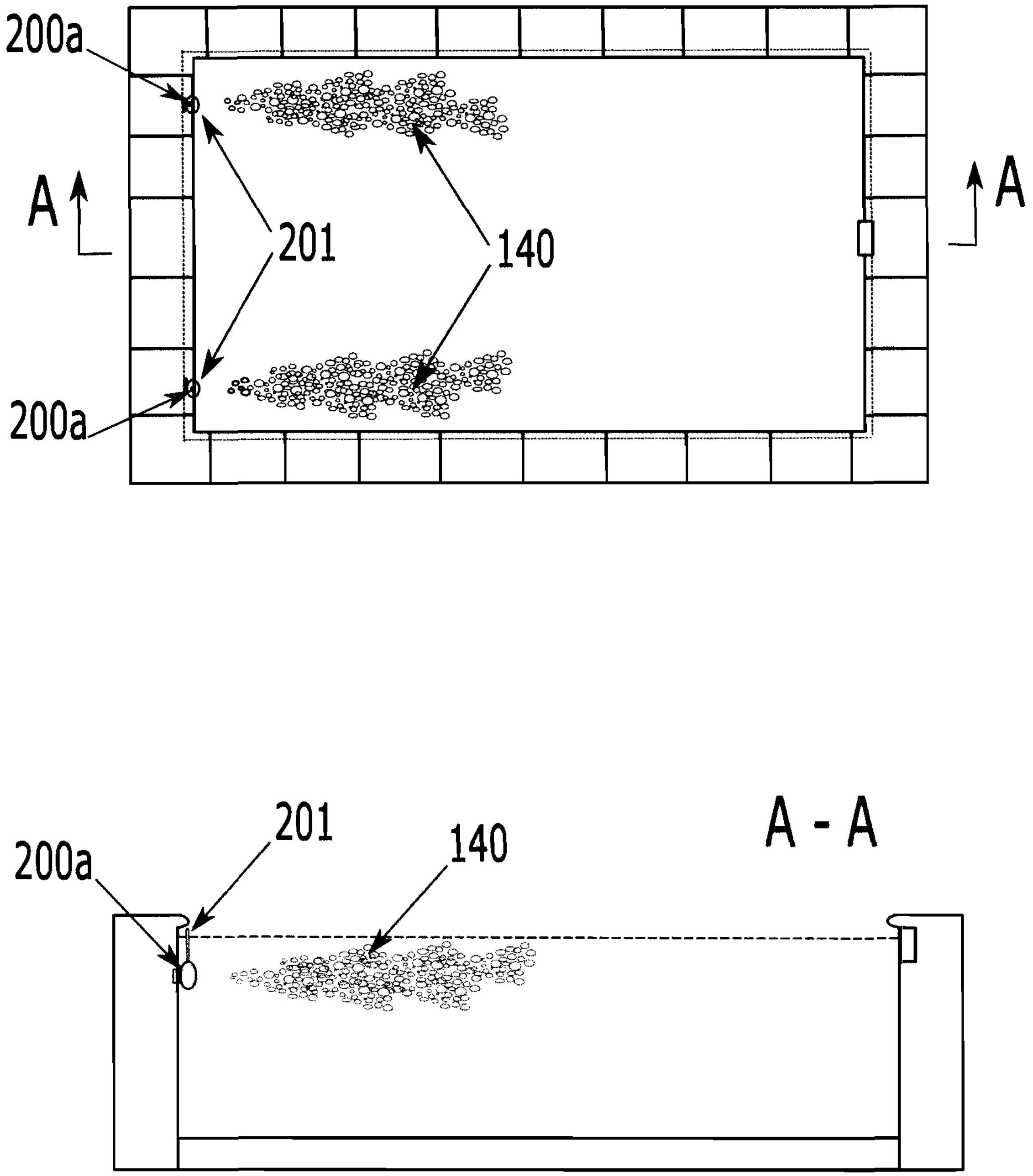
FIG. 4, is a top view and a longitudinal cross-section of a pool provided with two pool aerators according to the invention.

The spray body 100 is mounted by screwing the threaded flange 102 into an existing pool discharge nozzle, the air intake pipe 101 is slid into the spray body 100 so that the air slot 105 remains on the surface of the water and the water jet exits through the discharge nozzle, due to the optimal angle of inclination and the position in relation to the spray body 100, sucks the air through the intake pipe 101; air and water are mixed in the spray body and then evacuated with pressure over a length of about 2 m resulting in a curtain of air bubbles 106 (illustrated in FIG. 4).

Figure 2:
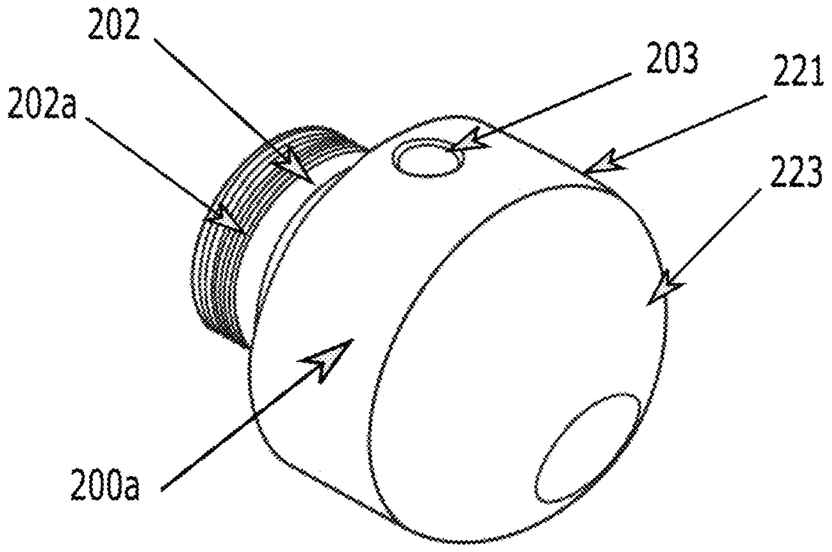
FIG. 2, is a perspective view of the preferred embodiment of the pool aerator.
Figure 2A:
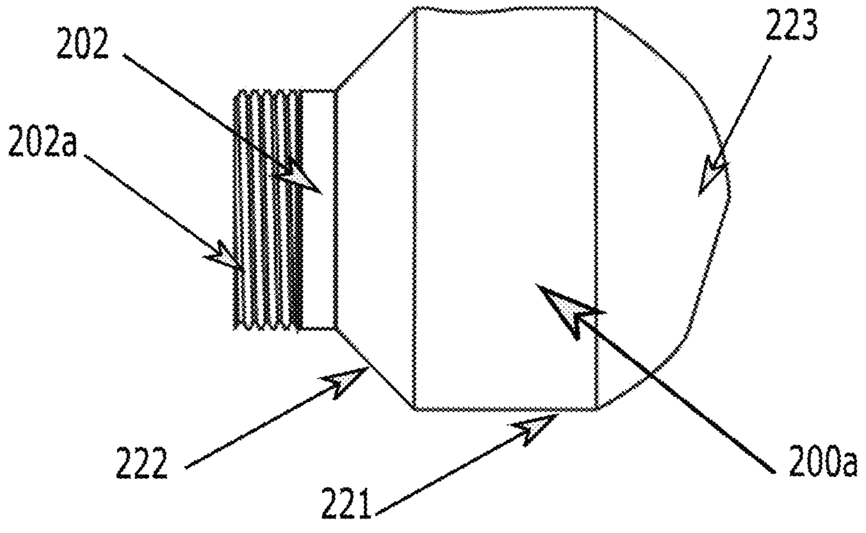
FIG. 2A, is a side view of the preferred embodiment of the pool aerator from FIG. 2.
Figure 2B:
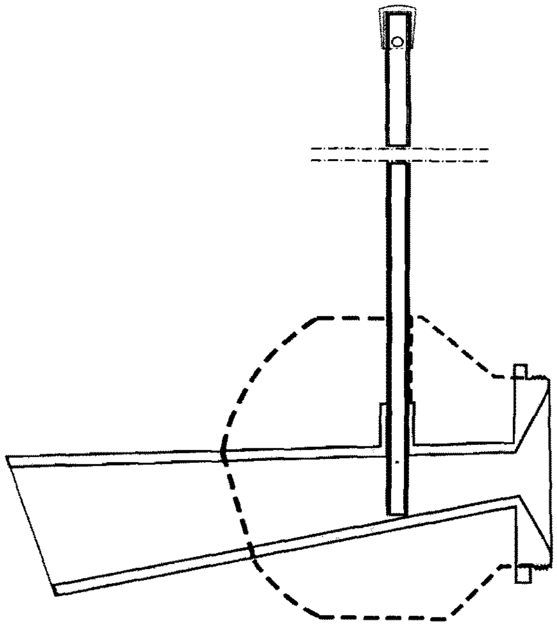
FIG. 2B, is a comparative cross-sections of the hemispherical shape of the aerator of FIG. 2, superimposed over that of the aerator in FIG. 1.
Figure 2C:
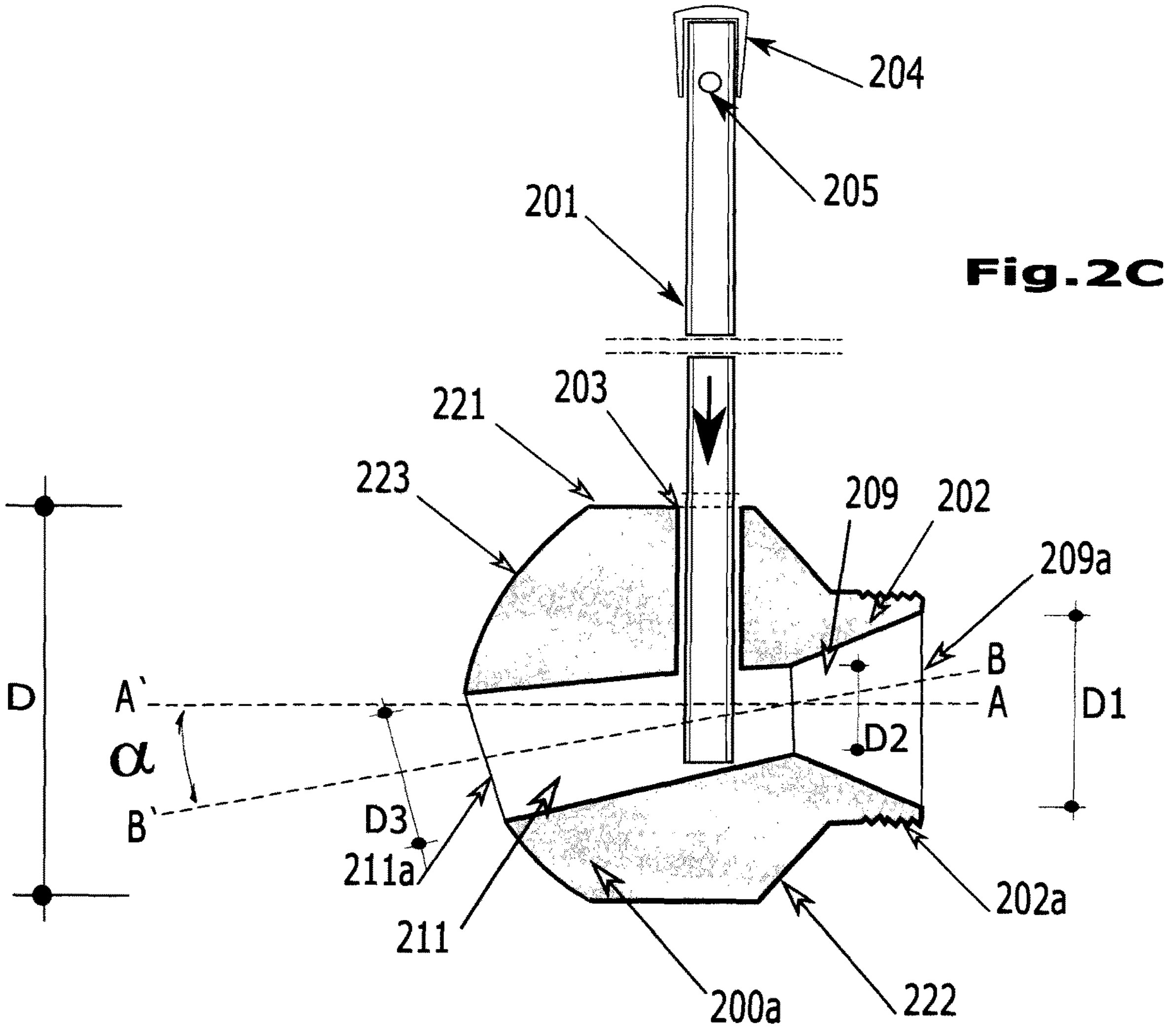
FIG. 2C, is a longitudinal cross-section view of the preferred embodiment of the body of the pool aerator in FIG. 2, and of the air intake pipe from the atmosphere.

With reference to FIG. 2, FIG. 2A and FIG. 2C, in a preferred embodiment of the invention, the body of the aerator (200*a*) comprises a rounded plastic object, having in the middle area a cylindrical portion (221), which continues at the end from the pool wall with a connecting means (202), corresponding to the outlet of the water recirculated in the pool, the middle portion (221) of the aerator body (200*a*) continuing with an area in the form of a hemispherical cap/dom (223), inside the aerator body (200*a*) being a Venturi tube made in the form of two frustoconical holes with a small common base, one for inlet (209) and the other (211) for mixing and discharging water mixed with air. The axes (A-A') and (B-B') of the two frustoconical trunks form an angle (a) between 10 and 20 degrees. The frustoconical mixing hole (211) communicates in the first third from the common base with a cylindrical hole (203) having a vertical axis, in which the lower end of the intake pipe (201) is inserted by sliding, until the inner wall of the frustoconical mixing and discharge hole (211) is reached.

The pool aerator according to the invention has two parts, preferably of plastic material—a pool aerator body 200*a* with rounded anti-impact shapes and an atmospheric air intake pipe 201 which is inserted into the aerator body, operating based on the Venturi principle, inside of the aerator body being found the pool aerator from FIG. 1, as shown schematically in FIG. 2B, adjusted to be surrounded and to fit the dimensions of the rounded body, for reasons of impact protection, robustness and for an enhanced aesthetic appearance. The body of the pool aerator shall be mounted by means of a connection means 202 to the water recirculation circuit, at least in one of the existing outlets to the pools with water recirculation circuit (preferably to be mounted in all, otherwise it is necessary to block the outlets without aerators in order to equalize the water pressure at the outlet), holes located below the pool water level, and pipe 201 that sucks air from the atmosphere from the water surface, is attached to the spray body in a cylindrical hole 203 which communicates with said Venturi tube. The pipe 201 has an upper end closed with a cylindrical plug/lid 204, with an inner diameter larger than the outer diameter of the intake pipe 201, below which is provided an atmospheric air intake hole 205, hidden/masked by plug 204.

The body 200*a* of the pool aerator with water recirculation circuit consists of a plastic object, generally round, having in the middle a cylindrical shape portion 221 of diameter D, this middle portion continuing at the end from the wall of the pool (which is mounted in the recirculated water discharge nozzle), with the connecting means 202, made in the form of a cylindrical portion with a diameter D1 smaller than the diameter D, the connection between them being made by a frustoconical portion 222. The connecting means 202 is provided with an external thread 202*a* corresponding to the recirculated water outlet in the pool, if it is provided with an internal thread. At the opposite end (from the pool wall), the middle portion 221 of the aerator body 200*a* is continued with a hemisphere-shaped portion (spherical caps) 223.

The Venturi tube inside the body 200*a* of the aerator is made in the form of two frustoconical holes 209 and 211 having the small common base (neck) of diameter D2. The frustoconical inlet hole 209 is located mostly in the connecting means 202, has the horizontal axis A-A', and the inlet port 209*a* of the diameter D1. The frustoconical conical hole 211 for mixing and evacuating water mixed with air, is located mostly inside the middle portion and the end of the hemispherical portion, having the longitudinal axis B-B' inclined with respect to the axis A-A' of the frustoconical inlet hole 209, with an angle α around 10-20° (sexagesimal degrees), and the outlet 211*a* of diameter D3. The frustoconical hole 211 communicates in the first third from the common base, with a cylindrical hole 203 having the vertical axis (perpendicular to the axis A-A' of the frustoconical inlet hole 209). In the cylindrical hole 203 is inserted by sliding, until the inner wall of the frustoconical mixing and discharge hole 211 is reached, the lower end of the intake pipe 202, thus automatically reaching the maximum yield position and angle.

With reference to FIG. 2C, the air intake tube 201 consists of a cylindrical pipe preferably made of plastic having an outer diameter that allows sliding through the cylindrical hole 203, and a length that makes its upper end stand above the water. This pipe is closed at the upper end by a plug 204, being also provided, also at this end, with an air absorption hole 205, round in shape or rectangular slot which ensures a low level of noise during operation. The intake pipe can be made of a single section or of several sections, for example two or three, tightly connected to each other.

Figure 2D:
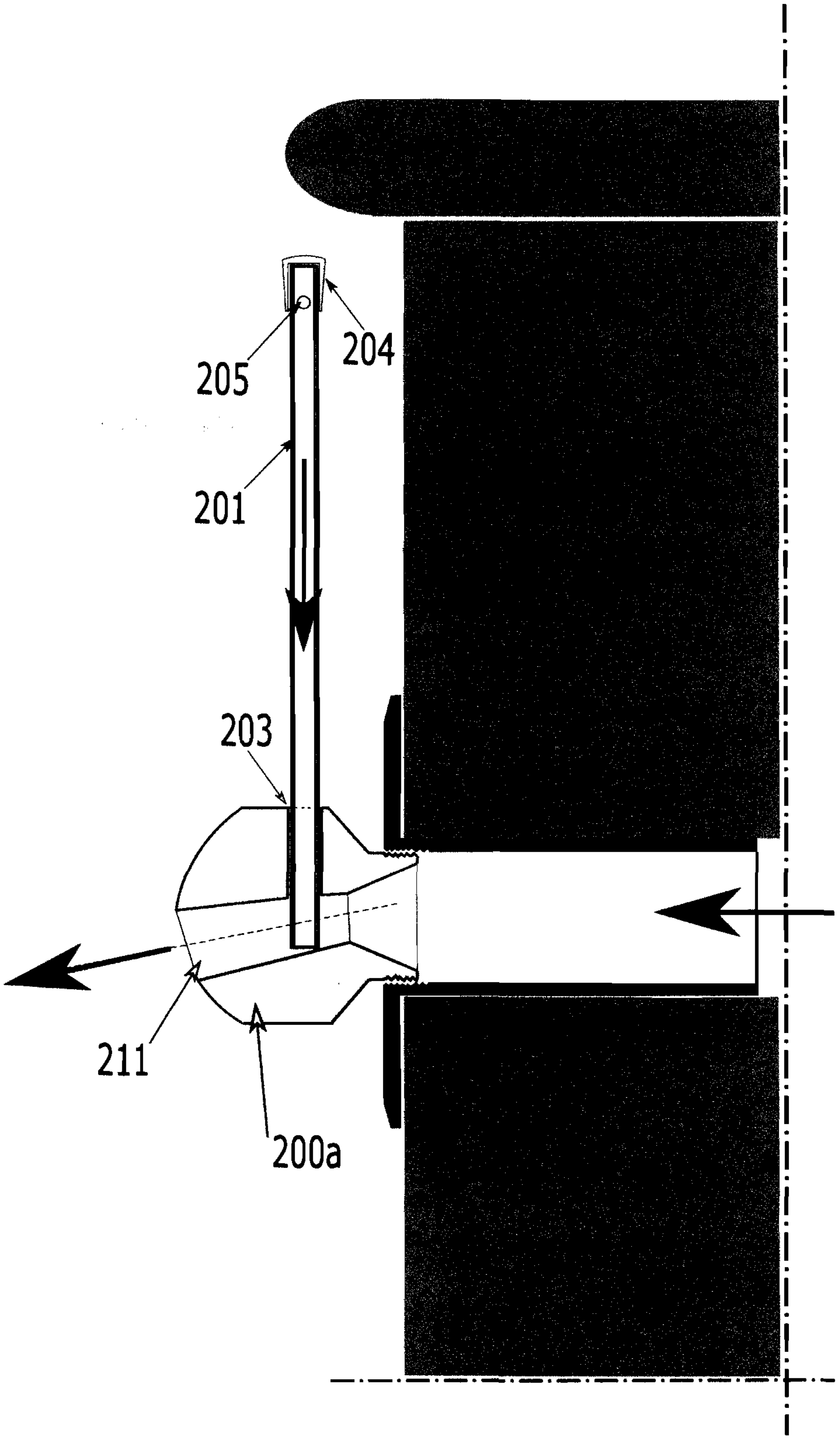
FIG. 2D, is a cross-section view of the aerator of FIG. 2, mounted in the existing nozzle of the pool.

FIG. 2D shows, in section, the way in which the pool aerator 200*a* and the air intake pipe 201 are mounted in the existing nozzle in the wall of a swimming pool with reinforced concrete walls, according to the invention.

Figure 3:
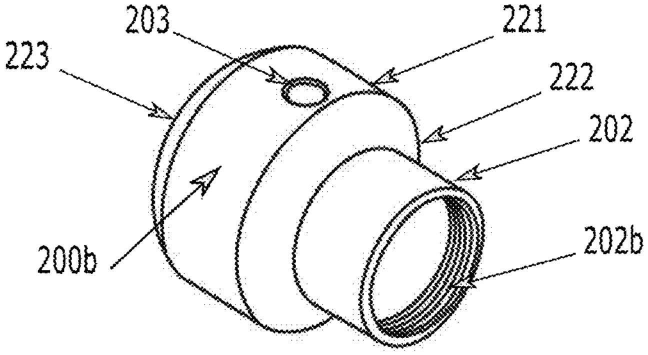
FIG. 3, is a perspective view of an alternative of the preferred embodiment of the pool aerator body according to the invention.
Figure 3A:
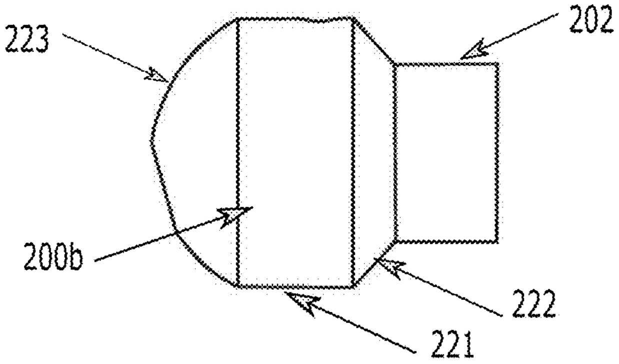
FIG. 3A, is a side view of the body of the pool aerator from FIG. 3.
Figure 3B:
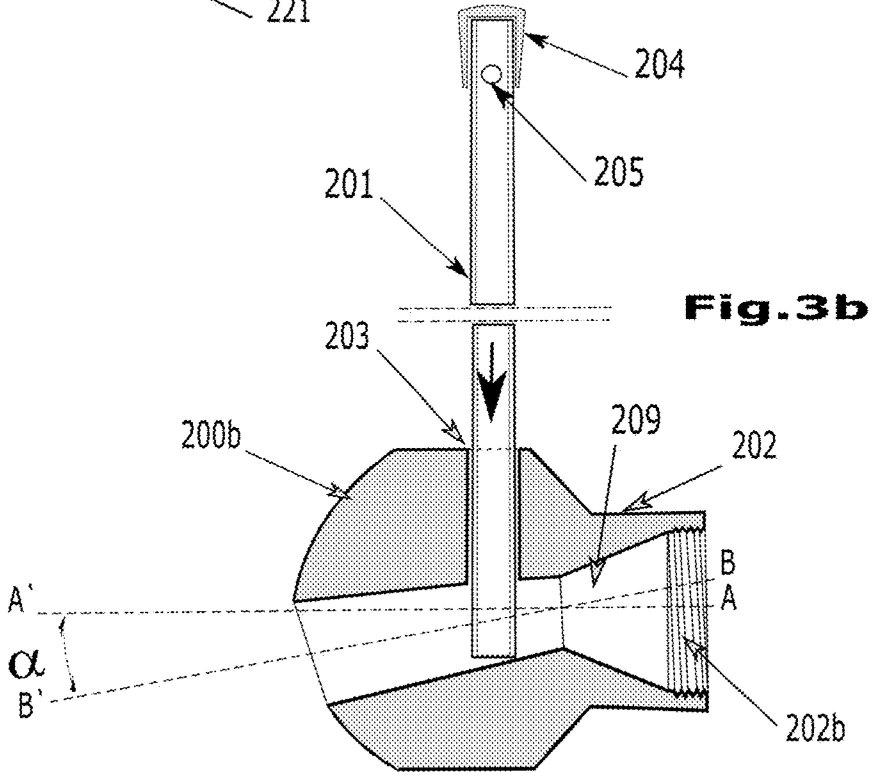
FIG. 3B, is a longitudinal cross-section of the body of the pool aerator from FIG. 3.

With reference to FIG. 3, FIG. 3A and FIG. 3B, in an alternative of the preferred embodiment, the body 200*b* of the pool aerator has the connecting means 202 made in the form of a cylindrical portion of diameter D1, being elongated so that the inlet hole continues with a cylindrical hole 202*b* of the same diameter D1 with the large base of the cone, said cylindrical hole (202*b*) being threaded inwards (female threaded) corresponding to the recirculation of the water recirculated in the pool, if it is provided with external thread, and which ensures connection to the recirculation circuit of water.

The body 200*a* or 200*b* of the pool aerator, with the exception of the vents of the Venturi tube 209-211 and the cylindrical hole 203, may be solid (made of homogeneous material) or may have a honeycomb structure with the provision of continuous surfaces for the aerator body (outer surface), for the Venturi 209-211 tube and for the cylindrical hole 203.

In a concrete/preferred embodiment, the body of the sprayer 200*a* is made of plastic, honeycomb structure and has inside the frustoconical hole 209 with approximate dimensions: the diameter D1 of the inlet 209*a* of 40 mm and the diameter of the neck D2 of 18 mm, the frustoconical hole 211 having a diameter D3 of the outlet 211*a* of approximately 28 mm, the cylindrical hole 203 having a diameter slightly larger than 11 mm. The entire spray body of the aerator has a total length of about 90 mm and the diameter D of the middle portion of 80 mm.

In the concrete/preferred embodiment of the invention, the air intake tube 201 consists of a cylindrical plastic pipe having an outer diameter of less than or equal to 11 mm and a length of about 350 mm, which makes an end rise at least 50 mm above the water level of the pool water (the recommended elevations for mounting the nozzles/discharge holes when constructing a pool are 300 mm below the water level).

The spray body 200*a* or 200*b* is mounted by screwing the threads 202*a* and 202*b* into an existing pool discharge nozzle, the air intake pipe 201 is slid into the spray body so that the air intake hole 205 remains at the surface of the water and the water jet pushed by the pump of the circuit coming out of the discharge nozzle sucks the air through the intake pipe 201. Air and water are mixed in the body of the sprayer and evacuated with pressure over a length of about 2 m, resulting in a curtain of air bubbles 140 (illustrated in FIG. 4).

FIG. 4 shows the top view and cross-section of a swimming pool (provided with a water recirculation circuit, which includes, among others, water filtration and treatment elements, a pump that absorbs water from the pool and discharges it back through some holes/discharge nozzles) in which two aerators according to the invention are mounted.

Use of other known materials for making the spray body 100, 200*a* or 200*b* and/or intake pipe 101 or 201, and use of other known profiles (polygon, ellipse, oval) for making the spray tube body 100, 200*a* or 200*b* and/or intake pipe 101 or 201, are obvious to a person skilled in the field and fall within the scope of the claims set out below.

The invention claimed is:

1. A swimming pool aerator provided with a water recirculation circuit, comprising:

a spray body with a Venturi tube channel and an atmospheric air intake pipe above a pool, wherein:

said spray body includes a frustoconical plastic tube, provided at a first, smaller diameter end with a connecting means to a recirculating water outlet in the pool, below a pool water level, a second, larger diameter end of the frustoconical plastic tube is a jet outlet of aspirated air together with recirculated water, in pool water, an axis of the frustoconical plastic tube is inclined at an angle (a) between 10-20 degrees to the perpendicular to a base plane of the connecting means, and in a first third of length of the spray body from the end with the connecting means, and said spray body is provided with a cylindrical branch also acting as guide, in which a lower end of the intake pipe is configured to slide until the lower end of the intake pipe reaches an inner wall of the frustoconical plastic tube.

2. The pool aerator according to claim 1, wherein the intake pipe can be made of a single section or of several sections connected to each other.

3. The pool aerator according to claim 1, wherein:

the connecting means is a cylindrical flange threaded on an outside, also having a hollow interior, which is also frustoconical in shape, being connected to the frustoconical plastic tube of the spray body, and the threaded flange is screwed into an existing nozzle in pool wall, thus ensuring installation of the aerator in the pool.

4. The pool aerator according to claim 3, wherein the intake pipe can be made of a single section or of several sections connected to each other.

5. The pool aerator according to claim 1, wherein:

the air intake pipe includes a plastic pipe having an outer diameter allowing the air intake pipe to slide through the cylindrical guide, and a length that makes an upper third of the air intake pipe rise above the water, and the pipe is closed at an upper end by a plug, and the upper end having a longitudinal slot for air absorption, which reduces noise level during operation.

6. The pool aerator according to claim 5, wherein the intake pipe can be made of a single section or of several sections connected to each other.

7. A hemispherical pool aerator provided with a water recirculation circuit comprising:

a spray body made in a form of a Venturi tube and an atmospheric air intake pipe, wherein:

the body of the aerator includes a rounded plastic object, having in a middle portion a cylindrical portion, which includes an end connected with a pool wall with a connecting means, corresponding to an outlet used for evacuating water recirculated in the pool, the middle portion of the aerator body continues with an area in a form of a hemispherical cap, inside the aerator body, being the Venturi tube made in a form of two frustoconical holes with a common base, one of the frustoconical holes functions as an inlet and the other of the frustoconical holes functions for mixing and discharging water mixed with air, a first frustoconical inlet hole is located between the connecting means having a horizontal axis and a second frustoconical mixing hole, the second frustoconical mixing hole located in the middle of the connecting means and a spherical portion of the aerator body, having a longitudinal axis inclined in relation to the horizontal axis of the frustoconical inlet hole at an angle («) between 10 to 20 degrees, and the second frustoconical mixing hole communicates in a first third from the common base with a cylindrical hole having a vertical axis, in which a lower end of the intake pipe is configured to slide, until an inner wall of the frustoconical mixing and discharge hole is reached.

8. The pool aerator according to claim 7, wherein:

the connecting means is made in a form of a cylindrical portion with a diameter smaller than the diameter of the middle portion, the connection between them being made by a frustoconical portion, and the connecting means is provided with an external thread corresponding to the outlet used for evacuating recirculated water in the pool.

9. The pool aerator according to claim 8, wherein:

the intake pipe is closed at an upper end by a plug, and the intake pipe has an air intake hole at the upper end, the intake hole being hidden under the plug and being round in shape, which reduces level of noise during operation.

10. The pool aerator according to claim 8, wherein the intake pipe can be made of a single section or of several sections connected to each other.

11. The pool aerator according to claim 7, wherein:

the connecting means of the body of the pool aerator is made in a form of a cylindrical portion, is elongated so that the frustoconical inlet hole continues with a cylindrical hole of the same diameter as a large base of the cone, and said cylindrical hole is threaded inwards corresponding to an outer thread of the outlet used for evacuating recirculated water in the pool.

12. The pool aerator according to claim 11, wherein:

the intake pipe is closed at an upper end by a plug, and the intake pipe has an air intake hole at the upper end, the intake hole being hidden under the plug and being round in shape, which reduces level of noise during operation.

13. The pool aerator according to claim 11, wherein the intake pipe can be made of a single section or of several sections connected to each other.

14. The pool aerator according to claim 7, wherein:

the intake pipe is closed at an upper end by a plug, and the intake pipe has an air intake hole at the upper end, the intake hole being hidden under the plug and being round in shape, which reduces level of noise during operation.

15. The pool aerator according to claim 7, wherein the intake pipe can be made of a single section or of several sections, connected to each other.

* * * * *